Figure 5:
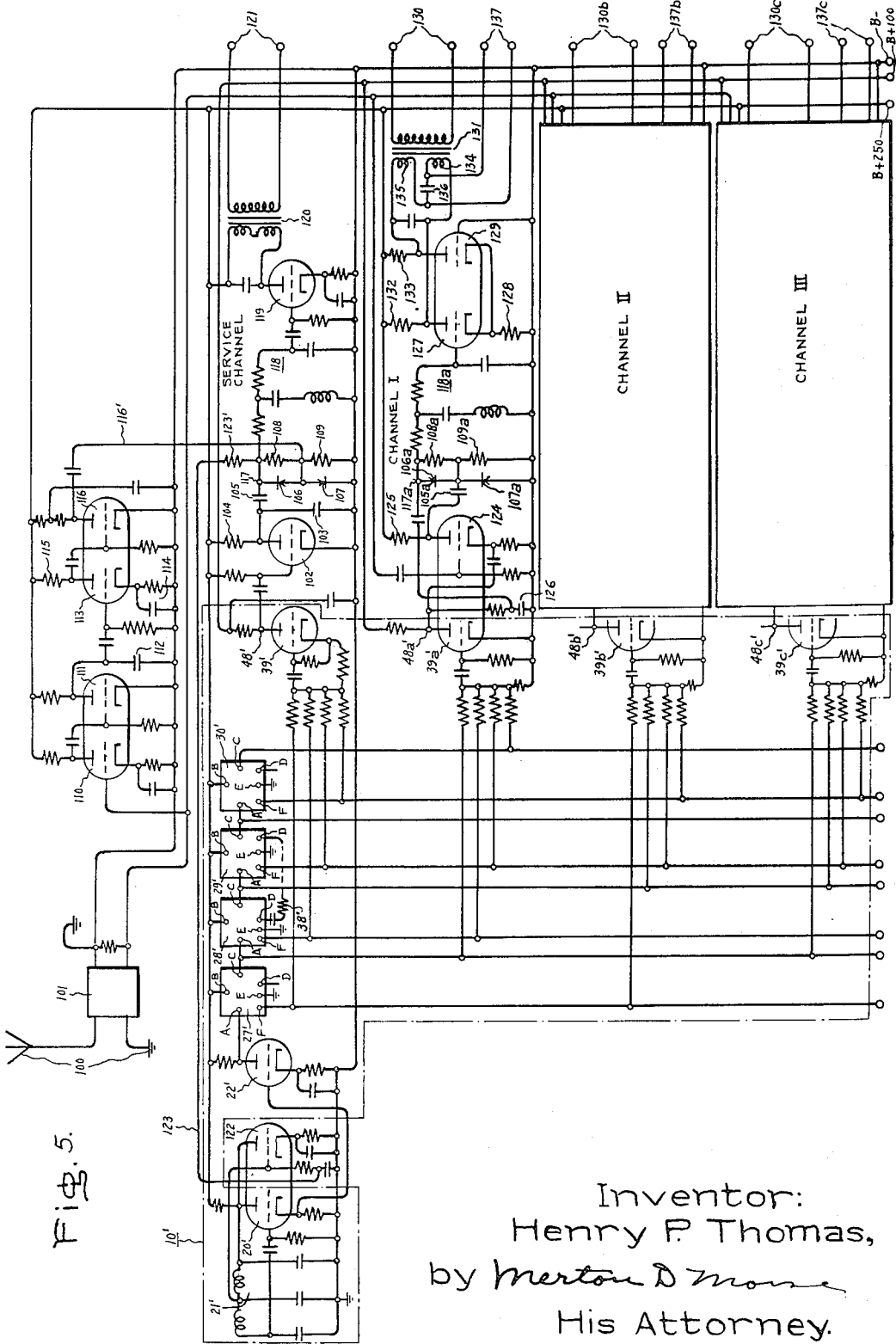

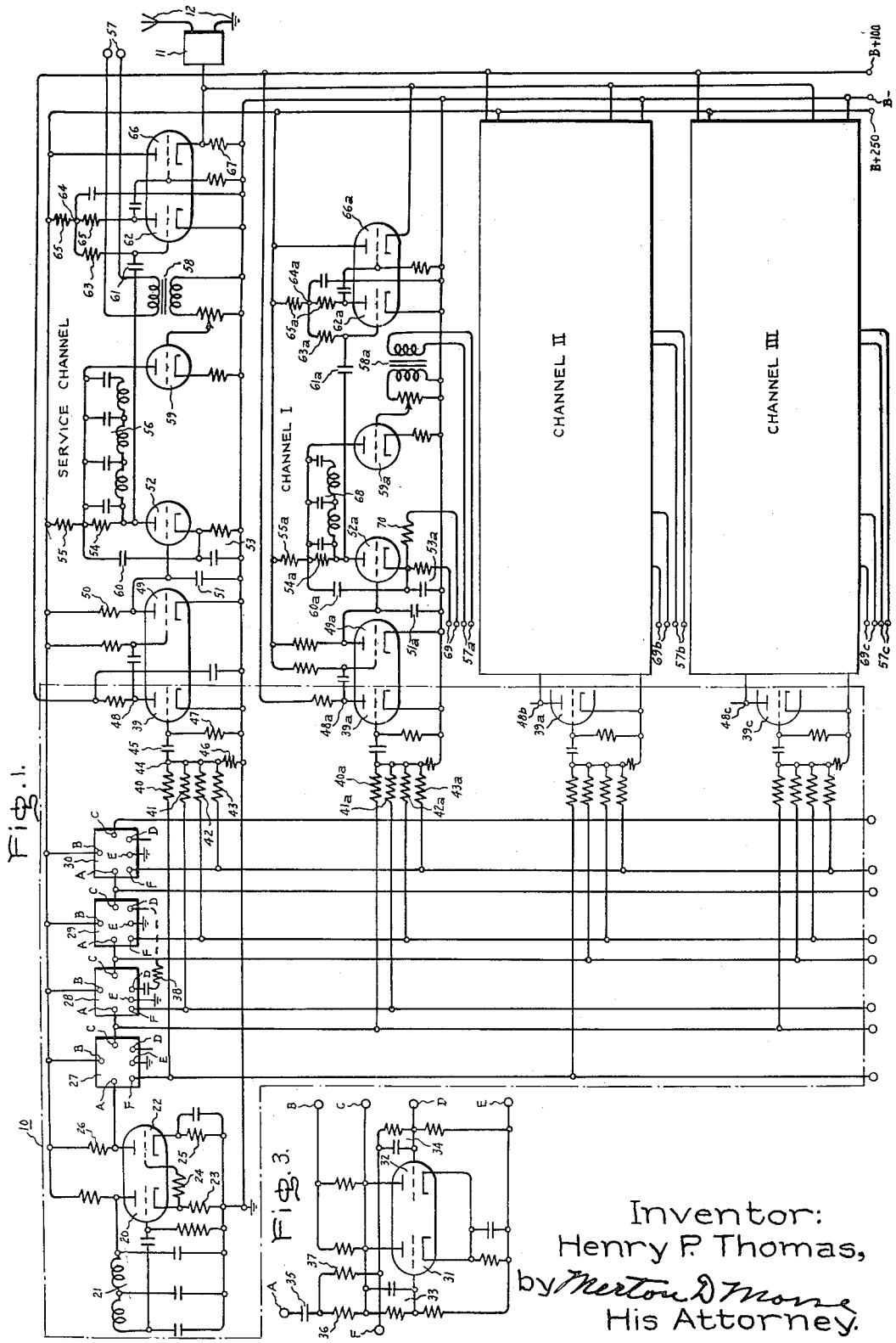

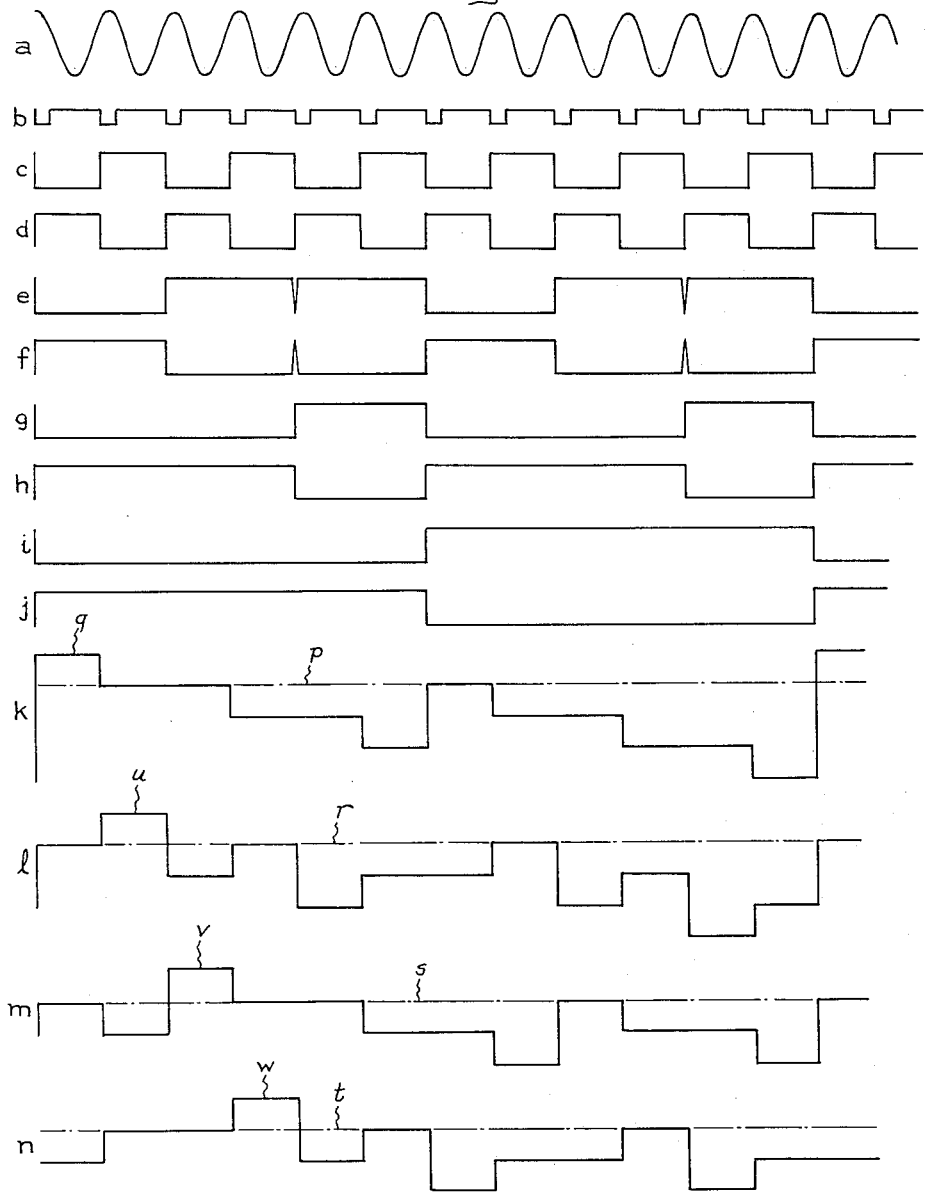

Inventor:
Henry P. Thomas,
by Merton D Moore
His Attorney.

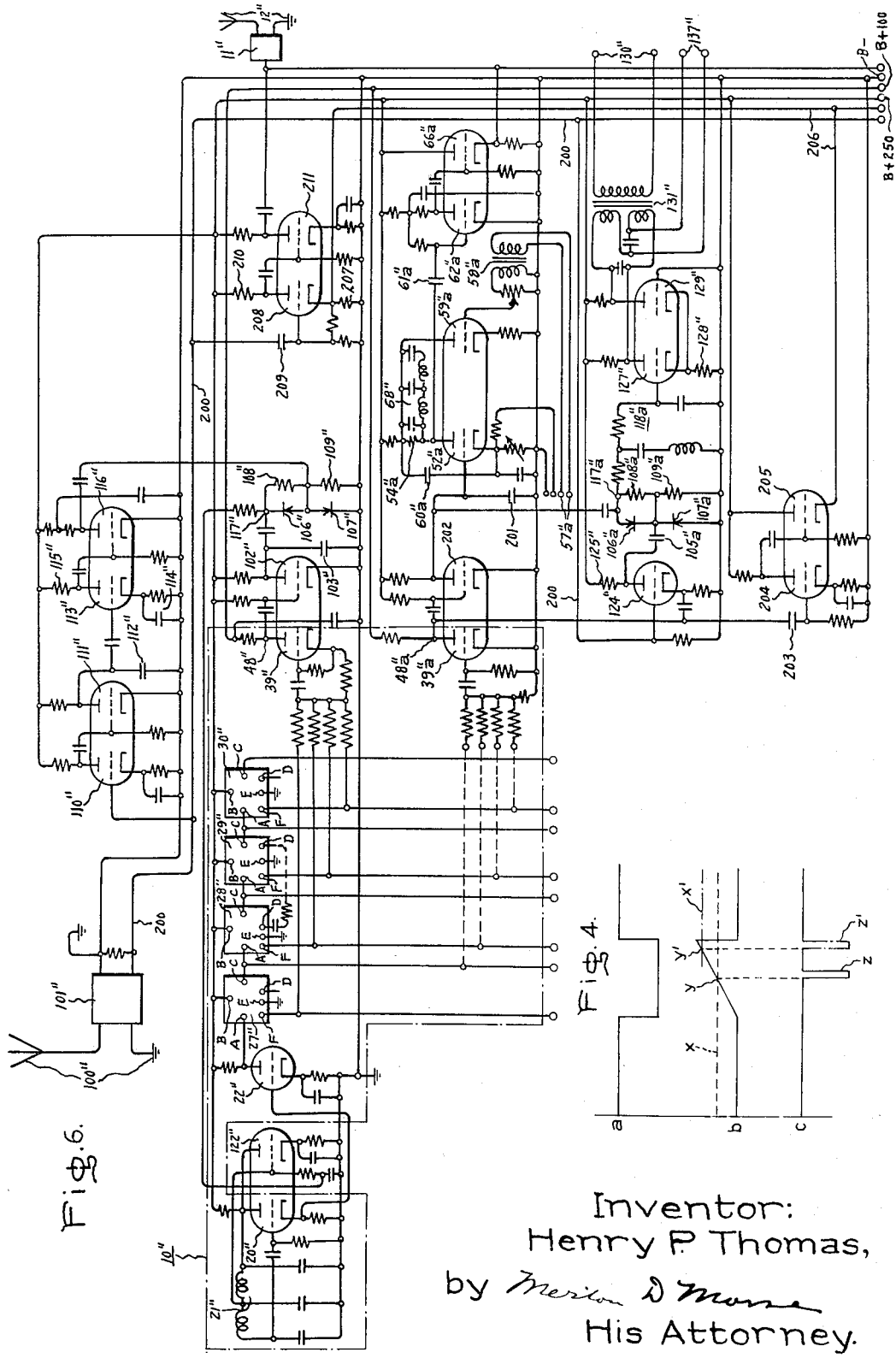
Inventor:
Henry P. Thomas,
by Merton D Morse
His Attorney.

United States Patent Office 2,747,017
Patented May 22, 1956

2,747,017

MULTIPLEX SYSTEM

Henry P. Thomas, Fayetteville, N. Y., assignor to General Electric Company, a corporation of New York Application January 30, 1952, Serial No. 269,089

2 Claims. (Cl. 179—15)

My invention relates to multiplex systems and particularly to that type of such systems, referred to as pulse position multiplex. In these systems, successive trains of pulses are transmitted and corresponding pulses of each train are modulated by a respective signal whereby as many signals are transmitted as there are pulses in the successive trains.

One of the objects of my invention is to provide certain improvements in pulse multiplex systems, particularly as to the manner of generating the different pulses and in the manner of maintaining necessary synchronism between the transmitting and receiving apparatus of the system.

Another object of my invention is to provide an improved relay apparatus having provisions for "dropping out" or eliminating one of the message signals and "inserting" in its place a new message signal.

Yet another object of my invention is to provide an improved pulse-generating system for multiplex apparatus.

Briefly stated, a pulse multiplex system in accordance with my invention comprises a pulse generator including a source of oscillations coupled to a plurality of cascaded frequency changers, such as frequency dividers. The output potentials of the several frequency dividers are combined in such a manner that a plurality of keying or enabling pulses are derived. Each of these enabling pulses corresponds in time to an interval in which one of the message-carrying pulses of each of the successive pulse trains occurs. Thus, the enabling pulses are utilized operatively to condition each of a plurality of channels in transmitting, receiving, or relay apparatus of the pulse-multiplex system.

The novel features which I consider to be characteristic of my invention are set forth with particularity in the appended claims. The invention itself, however, both as to its organization and method of operation, together with further objects and advantages thereof may best be understood by reference to the following description taken in connection with the accompanying drawings in which:

Fig. 1 is a schematic diagram, partly in block form, of a complete pulse-multiplex-type transmitter embodying the present invention; Figs. 2 and 4 represent various wave forms useful in explaining the operation of portions of the apparatus illustrated in Fig. 1; Fig. 3 is a detailed schematic diagram of a portion of the transmitter shown in Fig. 1; Fig. 5 is a schematic diagram, partly in block form of a complete pulse-multiplex-type receiver which may be utilized in connection with the transmitter of Fig. 1 and which embodies the present invention; and Fig. 6 is a schematic diagram, partly in block form, of a complete pulse-multiplex-type relay station which may be utilized together with the transmitter of Fig. 1 and receiver of Fig. 5, and which also incorporates the teaching of my invention.

Referring now to Fig. 1 of the drawings, the transmitter there represented is of the type which radiates a carrier wave wherein several messages are conveyed on a time-sharing basis, that is by pulse-multiplexing. It includes a pulse generating system 10 coupled to each of a group of operating channels including a Service Channel, designated by that legend of the drawing, and message channels identified on the drawing as Channels I, II, and III, respectively. Although but three message channels have been shown, it is to be understood that additional ones may be employed.

The several channels serve to generate reference and individual message-carrying pulses and are coupled to an amplitude modulator or pulser and radio-frequency transmitter 11. Unit 11 may be of any well-known construction for supplying to an antenna-ground system 12, a radio frequency carrier wave that is amplitude modulated by, or keyed on in response to, the pulses from the several channels. The antenna thus radiates successive trains of a pulsed carrier and corresponding pulses of each train convey a respective one of several message signals. Of course, the trains are repeated at a rate sufficiently rapid to carry the several messages.

As illustrated at the left extremity of the figure, a phase-shift-type oscillation generator, including an electron discharge device 20 which has its output circuit coupled to its input circuit by a phase-shifting network 21, supplies a sine wave potential to a clipper or amplitude limiter comprising another electron discharge device 22. The sine wave is derived at a cathode resistor 23 for device 20 and may, for example, have a frequency of 120 kc. s. and the form such as that represented by curve (a) of Fig. 2, which illustrates various wave forms of pulse generating system 10, plotted to a common time scale.

The control grid of device 22 is connected to the cathode-end of cathode resistor 23 through a current limiting resistor 24. A biasing network 25, including a resistor connected in parallel with a condenser, is included in the cathode circuit of device 22 and in response to the applied sine wave, a self-bias is developed in network 25. The amplitude of the applied potential wave is of such magnitude that for a short portion of each maximum positive excursion, grid current flows in device 22, whereas for the remainder of each cycle the grid is driven more negative than that value at which anode current is cut off. Thus, device 22 provides a pulse-type wave at its anode resistor 26 having a sequence of negatively poled pulses and a repetition frequency corresponding to that of the applied sine wave.

The derived wave, represented by curve (b) in Fig. 2, is supplied to a binary scaler or counter comprised of a cascade of similar frequency dividers 27—30. Each frequency divider may be of the type illustrated in Fig. 3 which includes a pair of electron discharge devices 31—32 in a so-called "flip-flop" circuit. The control grid of each of these tubes is connected to the anode of the other through a respective one of coupling networks 33 and 34, each of which includes a resistor paralleled with a condenser. Hence, when either tube is conductive, the other is cut off and that condition is maintained until a pulse of negative polarity is applied to the grid circuit of the conductive tube.

A terminal A is coupled to the control grid of device 31 through a coupling condenser 35, a coupling resistor 36 and the resistor portion of network 33. This terminal also is connected to the control grid of device 32 through condenser 35, a coupling resistor 37 and the resistor portion of network 34. Consequently, each time a negative pulse is applied at terminal A, the frequency divider is transferred from one operative condition to the other.

In that way each divider produces a square-wave-type output potential having repetition frequency equal to one-half that of the applied wave. The output wave is derived in one polarity sense at output terminals C, E and in the opposite polarity sense at output terminals F, E.

Inasmuch as dividers 27—30 are in cascade, they collectively constitute a counter for registering the number of pulses applied at the input circuit of divider 27. Ordinarily, a counter of four stages, such as the one illustrated, has a count-out, or returns to an initial condition after the application of sixteen pulses. However, a count-limiting network 38, including a resistor in series with a condenser, is connected between the terminals designated D of dividers 28—29. As a result of this connection, a feed-back potential is supplied by divider 29 to divider 28 such that a complete cycle of operation for divider 28 occurs upon the application of six pulses to divider 27 instead of four. Thus, the count-out condition for scaler 27—30 is reached after the application of twelve pulses at the input circuit of divider 27.

As stated hereinbefore, each frequency divider has two pairs of output terminals C, E and F, E. Frequency divider 27 produces at its output terminals F, E a wave represented at curve (d) in Fig. 2 and at its output terminals C, E a wave represented by curve (c).

Similarly, the frequency divider 28 produces at its corresponding output terminals waves represented at (f) and (e), respectively, in Fig. 2 and the dividers 29 and 30 produce at their corresponding output terminals the waves (h), (g), and (j), (i), respectively.

Connections are made to the control grid of an electron discharge device 39 through isolating resistors 40, 41, 42 and 43 from selected output terminals and the different frequency dividers such that waves (d), (f), (h) and (j) are applied thereto. More specifically, the resistors 40—43 extend between respective ones of the terminals designated F of the frequency dividers and a terminal 44 in turn coupled to the control grid of device 39 through a coupling condenser 45. Terminal 44 is grounded through a resistor 46 having a resistance value lower than that of any of the resistors 40—43 and the control grid of device 39 is grounded through a grid resistor 47.

The waves designated (d), (f), (h) and (j), when combined on the control grid of device 39, produce a wave represented at (k) in Fig. 2. This device derives its anode supply from a terminal conventionally designated B+ 100. It is biased by operation of its grid resistor 47 and coupling condenser 45 to be conductive only during the portion $q$ of curve (k) which drives the control grid in a positive direction relative to the cut-off bias represented by horizontal dash-dot line $p$. During all other intervals, exclusive of the one designated $p$, device 39 is non-conductive; however, during the intervals $p$ a drop in voltage, or a negative going pulse, is produced in the anode circuit of device 39 and is available at an output terminal 48.

The grid of an electron discharge device 39A is similarly connected through isolating resistors 40a—43a to output terminals of the frequency dividers, so selected that wave (l) is applied thereto. As a result, a series of pulses occur in its anode circuit, and are available at a terminal 48a. Each of these pulses is produced during one of the portions $u$ of the wave (l). The waves (m) and (n) similarly are produced on the grids of electron discharge devices 39b and 39c, and respective sequences of square wave pulses appear on the anodes of each and are available at terminals 48b and 48c. Each of these sequences of pulses is produced during one of the portions $v$ and $w$ of curves (m) and (n).

It is appropriate to point out that the pulses at terminals 48—48c, which may be referred to as enabling pulses, serve to "turn on" the several channels of the transmitter in a selected time order. Specifically, successive pulses corresponding to curve portion $q$ (Fig. 2k) operatively condition the Service Channel, those corresponding to curve portions $u$ "turn on" Channel I, and so on. The time-modulated or message pulses for each of the channels occur during the intervals defined by the associated, successive enabling pulses. Of course, the extent of time-shift with modulation for any series of message pulses is limited to the duration of the associated interval so that the various messages may be separated by time-selective means later to be described.

Since twelve enabling pulses are possible in each "train" interval, eight additional channels may be employed. The required enabling pulses may be derived by employing a corresponding number of coupling network-amplitude selector arrangements in addition to those illustrated. The manner of connecting the coupling networks of such arrangements to the several dividers 27—30 is believed to be obvious from the material presented hereinbefore.

Referring to the Service Channel portion of the transmitter of Fig. 1, the enabling pulses which appear at terminal 48 are represented by curve (a) of Fig. 4. In that figure there are shown various wave forms, characterizing the operation of this portion of the transmitter, plotted to the same time scale. These pulses are supplied to the grid circuit of an electron discharge device 49 which is statically biased to be conductive in the absence of applied pulses. Its anode is connected to a source of operating potential conventionally designated B+250 through an anode resistor 50, and a condenser 51 is connected between its anode and cathode. During intervals during which no pulse is derived at terminal 48, condenser 51 is charged to a relatively low value because of the voltage drop due to anode current flow through resistor 50. However, for the duration of each enabling pulse, the grid of device 49 is driven more negative than the cutoff value and condenser 51 charges exponentially toward the B+250 potential. At the termination of the enabling pulse, condenser 51 discharges rapidly through the anode-cathode current path of device 49 to its initial low value thereby producing a triangularly shaped or sawtooth type wave, such as represented by curve (b) of Fig. 4. Since but a small portion of the exponential charging characteristic of condenser 51 is utilized, the gradually sloping sections of the wave are highly linear.

The derived sawtooth signal is supplied to the grid circuit of an electron discharge device 52 provided with a cathode bias network 53 and in response to the applied sawtooth, a self-bias for the device is developed. This bias condition is represented by horizontal dash line $x$ in Fig. 4(b) and is such that device 52 becomes conductive at a point in time, designated $y$, during the occurrence of the applied sawtooth. The change in conductive condition is rapid and a pulse of current is thus produced on anode resistor 54 which is connected between the anode of device 52 and the B+ 250 terminal through another resistor 55. This pulse travels down an unterminated delay line 56, that is coupled to resistor 54 and which comprises a series of inductances and shunt capacitors, to the opposite end and is reflected back to resistor 54. In this way a pulse is produced on resistor 54 having a fixed duration determined by the delay in line 56. This pulse is initiated at a time determined by the bias on the cathode of device 52.

Signal voltage to be transmitted, which may represent voice, music, or other desired signals, is applied at terminals 57 and transmitted through transformer 58 to an amplifier which includes an electron discharge device 59. The anode current in amplifier device 59 flows through resistor 55 and the potential at its anode varies with the desired signal. The anode is connected through a condenser 60 to the cathode of discharge device 52 and hence the grid-to-cathode potential of the latter device is varied in accordance with the signal to be transmitted. In this way the point on the sawtooth wave, (b) of Fig. 4, at which device 52 becomes conductive, and hence the time of initiation of the pulses $z$, represented in curve $c$ of Fig. 4, is varied with the instantaneous amplitude variations of the desired signal. For example, if the desired signal produces bias change to the value represented by the horizontal dash-dot line $x'$, device 52 becomes conductive at a different point in time, designated $y'$, to initiate a pulse $z^-$ shown in curve $(c)$.

Pulses $z$ are supplied through a condenser 61 to an electron discharge device 62. The grid of this device is connected through a resistor 63 to a point 64 on the anode load resistor 65 of device 62 so that normally current flows in the device to an extent determined by the anode operating voltage. Pulses $z$, supplied through condenser 61 with negative polarity, have an amplitude sufficient to drive the grid of device 62 more negative than the cutoff value. Thus, these pulses are reproduced on the anode of device 62 as positive square pulses of fixed, predetermined amplitude. The shaped pulses are then supplied to the grid of an electron discharge device 66 the anode of which is directly connected to the source of operating potential and the cathode of which is connected through a load resistor 67 to the negative terminal of the source. Device 66 thereby operates as a cathode follower and the applied pulses $z$ are reproduced without a charge of polarity at the resistor 67 and are then supplied to transmitter 11. This transmitter thus supplies to antenna-ground system 12 a pulse of radio-frequency waves corresponding to each pulse $z$ for radiation into space.

In this way a series of pulses of constant duration are radiated and these pulses are modulated in their time of occurrence according to the instantaneous values of the electromotive force at input terminals 57 which, of course, vary in accord with the signals to be transmitted. By means later to be described, the desired signal may be reproduced from the time-position relationship of the pulses in this series.

Channel I is essentially like the Service Channel and comprises similar elements identified by the same reference numerals followed by the letter "$a$." This channel, of course, derives its enabling pulses at terminal 48$a$ so that it is operatively conditioned during repetitive intervals which follow the operating intervals of the Service Channel. Moreover, instead of utilizing a delay network like the one designated 56, a delay network 68 is coupled to resistor 54$a$. This network has lesser number of elements than does network 56, and, hence, Channel I produces a pulse of shorter duration than the one derived in the Service Channel.

Another signal to be transmitted may be applied at input terminals 57$a$ to control the time occurrences of the Channel I pulses in accordance with the instantaneous amplitude values of that signal, in the same manner as described in connection with the Service Channel. The time-modulated pulses then are supplied through shaper device 62$a$ and cathode follower device 66$a$ to unit 11 wherein they amplitude modulate the carrier wave radiated by antenna system 12.

In addition, another set of input terminals 69 is provided. These are connected to cathode circuit 53$a$ of tube 52$a$ through a resistor 70. Thus, upon establishing a connection between terminals 69, the bias of tube 52$a$ is shifted to produce a static pulse-time displacement for operating a ringing or dialing circuit of a receiver, as will be more apparent from the discussion to follow.

Channels II and III are of the same construction as Channel I, and, hence, are represented by respective rectangular boxes. Of course, each of these channels is operatively conditioned in sequence by the respective enabling pulses at terminals 48$b$ and 48$c$. Individual messages to be transmitted may be applied at terminals 69$b$ and 69$c$ so that the timing of the pulses derived in each of Channels II and III may be varied in accord with a particular message to be transmitted.

Thus, the transmitter of Fig. 1 produces repeating trains of pulses in each of which a reference pulse of long duration from the Service Channel is followed by pulses from Channels I, II and III, all of shorter duration. These latter pulses are of shorter duration so that receiving equipment may distinguish reference pulses from the others for synchronizing purposes.

Turning now to the receiving apparatus shown in Fig. 5 of the drawings, the carrier wave from the transmitter of Fig. 1 is intercepted by an antenna-ground circuit 100 and applied to a radio-frequency amplifier and detector unit 101 wherein the pulse modulation components of the carrier are derived. These components are applied to a Service Channel and Channels I—III, which correspond to the similarly designated channels of the transmitter.

The receiver also includes a pulse generating system 10' which is substantially identical in construction and operation to the one incorporated in the transmitter. Hence, this system and the elements included therein are identified by the same reference characters found in the pulse generating system of Fig. 1, followed by a prime (') designation.

This pulse generating system includes an oscillator 20'—21', an amplitude clipper device 22' and a cascade of frequency dividers 27'—30', all exactly as described in connection with Fig. 1. The output terminals of the frequency dividers are connected to the grids of electron discharge devices 39', 39$a$', 39$b$' and 39$c$' to produce thereon the waves $(k)$, $(l)$, $(m)$ and $(n)$ of Fig. 2, as described in connection with Fig. 1. These waves produce respective series of pulses at the points 48', 48$a$', 48$b$' and 48$c$' in the respective channels. Since through means presently to be described, the oscillator 20'—21' is maintained in synchronism with oscillator 20—21 of the transmitter, all of these various series of enabling pulses occur synchronously with the corresponding series of pulses of the transmitter. In other words, each pulse of each series occurs simultaneously with a similar pulse of the corresponding series at the transmitter of Fig. 1.

Referring now to the Service Channel portion of the receiver, each negative pulse at terminal 48' renders the grid of an electron discharge device 102 sufficiently negative to interrupt anode current therein. Condenser 103, which is connected between the anode and cathode of this device, charges through an anode resistor 104 for device 102 during the occurrence of the pulse. On termination of the pulse, the condenser discharges through device 102 and in this way a sawtooth wave is produced on condenser 103.

Condenser 103 is shunted through a condenser 105 by a pair of rectifiers 106—107, connected in opposition. Each of a pair of series resistors 108—109 is connected in shunt with one of the rectifiers 106—107.

This circuit 106—109 operates as a phase detector to demodulate the time variations between the pulses of a given series generated at the receiver to correspond with a predetermined series of time-modulated pulses received from the transmitter.

In order to derive a pulse wave, corresponding to the reference pulse components alone of the composite multiplexed wave, for application to phase detector unit 106—109, the output of detector unit 101 is supplied to the grid circuit of an electron discharge device 110. After amplification in device 110, the pulse wave is applied with negative polarity to the grid circuit of an electron discharge device 111 and each pulse drives the grid of device 111 more negative than the cutoff value. Since the reference pulses are of a greater duration than the other channel pulses, device 111 is cut off for longer intervals during the occurrences of reference pulses and a condenser 112, connected between the anode and cathode device 111, is permitted to charge to a greater extent during each of such intervals than during the intervals of the other pulses. As a result, a sequence of pulses, in which pulses of greater amplitude represent the reference pulses as compared with the others, is supplied to the grid circuit of an electron discharge device 113. Device 113 is provided with a cathode-bias network 114 and the applied wave has sufficient magnitude that a self-bias potential is developed in the bias network. This bias is such that only those pulses of greater amplitude are sufficient to produce conduction in device 113 whereas for all other pulses this device remains in a non-conductive condition. Device 113 thus serves to separate the pulses of greater magnitude, which appear at its anode resistor 115. The pulses at anode resistor 115 are then applied to the grid circuit of an electron discharge device 116 which amplifies and shapes these pulses before application to the junction of rectifiers 106—107 of the phase detector.

As pointed out hereinbefore, the sawtooth wave developed at condenser 103 is applied over conductor 116' to the point intermediate the rectifiers 106 and 107 of the phase detector. The time variations of the pulses supplied by device 116 occur with reference to the mid-points in time of the sawtooth undulations, assuming, of course, that systems 10 and 10' of the transmitter and receiver are perfectly synchronized. These time variations of the applied pulses cause one of rectifiers 106—107 to conduct to a greater extent than the other, depending upon the direction and magnitude of the instantaneous frequency deviations from the aforementioned mid-points in time. As a result, there is developed at junction 117 of condenser 105 and rectifier 106 a potential having amplitude variations corresponding to the variations in time of the applied pulses. This undulating potential represents the signal conveyed via the reference pulse components alone of the composite signal, and it is supplied to a band-pass filter network 118.

Network 118 translates with substantially no attenuation signals within the desired modulation frequency range, such as the audio-frequency band, to the exclusion of other frequency components, and the demodulated signal is translated thereby to the grid circuit of an electron discharge amplifier 119. An output transformer 120 couples the anode circuit of device 119 to a pair of output terminals 121. Hence, the derived signal is available at these terminals and a reproducing device, such as a loud speaker, may be coupled thereto for utilizing the signal.

In order to maintain the necessary precise synchronism between generating systems 10 and 10' of the transmitter and of the receiver, the Service Channel portion of the receiver is equipped with an automatic phase control arrangement. This includes an electron discharge device 122, in a reactance tube circuit, coupled to phase shifting network 21'. The grid circuit of device 122 is connected over conductor 123 and a resistor 123' to terminal 117 of phase detector 106—109 and the anode and grid circuits of device 122 are so coupled together that a reactance is presented thereby across a portion of network 21' having a value dependent upon the potential applied to the grid circuit.

When oscillators 20—21 and 20'—21' of the transmitter and receiver are precisely synchronized, the average time occurrences of the reference pulses, and of the corresponding pulses supplied by device 116, coincide with the exact mid-points in time of the sawtooth undulations developed at condenser 103. This means that the Service Channel enabling pulses of both the transmitter and receiver concur in time. For such a condition rectifiers 106—107 conduct equal amounts of current, and the resulting average potential at terminal 117 is zero. Hence, no control potential is applied to the grid of reactance device 122 and no phase adjustment is made.

However, if the Service Channel enabling pulse is displaced in time so that the sawtooth mid-points occur either earlier or later than the pulses supplied by device 116, one diode or the other conducts to a greater extent. The resulting control potential, applied to the grid circuit of reactance device 122, thus may be negative or positive and the operating phase is altered until the required phase relation is achieved to maintain synchronism between the transmitter and the receiver.

Of course, since the reference pulses from the transmitter are time-modulated, the time constants of the just described automatic phase control arrangement are designed, in a known manner, to preclude a phase adjustment in response to such modulation. Specifically, the grid circuit of device 122 is made slow acting so that the relatively fast time variations, due to modulation, produce no phase change, whereas gradual shifts are compensated.

Referring now to the portion of receiver of Fig. 1 designated Channel I, the entire demodulated signal from the detector portion of unit 101 is supplied to the grid circuit of an electron discharge device 124. This device is arranged to develop a self-bias potential in response to the signal applied to its grid of a value which maintains the device in a normally disabled or non-conductive condition. The enabling pulses at terminal 48a' are applied to the cathode circuit of device 124 with negative polarity, and since each of these enabling pulses effectively drives the cathode of the device more negative than its grid, it is operatively conditioned for the duration of each enabling pulse. Since the pulse generating systems of the receiver and transmitter are maintained in precise synchronism, the enabling pulses at terminal 48a' occur during the intervals in which the time modulated Channel I pulses of the transmitter are produced. Hence, only the Channel I pulse components are developed at anode resistor 125 of device 124.

These pulses are supplied by a condenser 105a to the junction of rectifiers 106—107 of a phase detector, which additionally includes resistor 108a—109a. The phase detector is also supplied with a sawtooth wave derived by a condenser 126. This condenser is connected between point 48a' and ground through a resistor, and, hence, each sawtooth undulation on condenser 126 coincides in time with each Channel I enabling pulse at that terminal. The sawtooth wave coacts with the separated Channel I message pulses in phase detector 106a—109a and demodulation of time variations occurs in the same manner as described in connection with detector 106—109 of the Service Channel. Thus, there is derived at terminal 117a a message signal which is supplied through a band-pass filter 118a to the grid circuit of an electron discharge amplifier 127.

Device 127 has a cathode resistor 128 in a common cathode circuit with another electron discharge device 129, the control grid of which is grounded. Device 129 thus is operated as a grounded grid cathode-driven stage and push-pull output signals, available in the anode circuits of devices 127 and 129, are supplied to a pair of output terminals 130 through a transformer 131. A reproducing device may be connected to the output terminals for utilizing the derived message.

Devices 128 and 129 have individual anode resistors 132 and 133, and each anode is connected to one extremity of a pair of primary windings 134—135 of transformer 131. The remaining extremities of windings 134—135 are connected to a condenser 136 in parallel with another pair of output terminals 137. The capacitance value of condenser 136 is selected to provide a low enough reactance to complete the primary circuit of transformer 131 for message frequency components. In addition, the resistance values of the anode loads 132—133 and the value of cathode resistor 128 are apportioned so that during the operating intervals of ordinary pulse-message time modulation, the anode currents of devices 127 and 129 are balanced and the average value of the resulting output potential at terminals 137 has a quiescent which may be equal to zero. However, when terminals 55a of the transmitter shown in Fig. 1 are connected together to produce a pulse displacement which does not change at a rapid rate, the anode currents of devices 127 and 129 are unbalanced and a control potential is developed at terminals 137. This control potential may be utilized to operate conventional dialing or ringing circuits (not shown) in a known manner.

Channels II and III of the receiver are essentially identical to Channel I and, hence, are illustrated by respective rectangular boxes. Of course, the amplitude selectors 39b' and 39c' of these channels are so connected with the output circuits of the frequency dividers 27'—30' that enabling pulses are developed at terminals 48b' and 48c' with the required timing for providing sequential operation of these channels corresponding to that of Channels II and III at the transmitter.

Relay equipment, shown schematically in Fig. 5, may be utilized in connection with the transmitter of Fig. 1 and receiver of Fig. 5 in a conventional manner to span greater distances between the transmitter and receiver than normally possible. For such operation, the radiated carrier wave is intercepted and the pulse modulation components thereof utilized to modulate another carrier after the pulses are reshaped and without alteration in their timing. The relay equipment also includes a provision for deriving the message conveyed by one series of multiplexed pulses for "dropping out" that series and for "inserting" in place thereof a new series of pulses carrying another message.

This equipment comprises elements which correspond to those included in the transmitter of Fig. 1 and in the receiver of Fig. 5. Such elements are identified by the same reference characters followed by a double prime (") designation.

The relay equipment includes a pulse generating system 10" which is comprised of an oscillator 20"—21" coupled to a clipper device 22" in turn coupled to a counter 27"—30". The various stages in the counter are coupled to amplitude selectors 39"—39a" and the system operates exactly as described in connection with the corresponding system 10 of Fig. 1 to produce enabling pulses at points 48"—48a". With generating system 10" precisely synchronized with system 10 of the transmitter, the enabling pulses at points 48"—48a" concur with those for the Service Channel and Channel I, respectively, of the transmitter.

It is assumed that the "drop out and insert" function is performed on Channel I pulses, but this may be done for any selected one of the channels. Hence, the connections between the output circuits of dividers 27"—30" and amplitude selector 39a" are shown in broken lines.

The wave radiated by the transmitter of Fig. 1 is intercepted by antenna-ground system 100" and the pulse modulation components are derived by radio frequency amplifier and detector unit 101". These components are supplied to the grid circuit of an electron discharge amplifier 110". The amplified pulses are then applied to the grid circuit of electron discharge device 111" which has a condenser 112" connected between its anode and cathode. Device 111" and condenser 112" operate just as the similarly designated elements of the receiver in Fig. 5 to produce a sequence of pulses wherein the reference pulse components, which are of longer duration than other components in the received wave, are represented by pulses of greater amplitude.

This sequence of pulses is applied to the grid circuit of device 113" which separates the larger pulses and these appear at anode resistor 115". The pulses at anode resistor 115", representing reference pulses only, are supplied to the grid circuit of electron discharge device 116" and are subjected to shaping and amplification before application to phase detector 106"—109".

The Service Channel enabling pulses at terminal 48" are applied to the grid circuit of an electron discharge device 102" having a condenser 103" connected between its anode and cathode. Hence, there is applied to phase detector 106"—109" a sawtooth wave produced by condenser 103" in response to the Service Channel enabling pulses. Point 117" in the phase detector is connected to the grid circuit of electron discharge device 122", in turn, coupled to network 21" of the oscillator within generating system 10". Thus, the phase detector controls the reactance presented by device 122" at network 21" to provide automatic phase control in the same manner as described in connection with the receiver of Fig. 5. In this way, the required precise synchronism is maintained between pulse generating system 10 and 10" of the transmitter shown in Fig. 1 and of the relay equipment.

Although the circuit elements associated with phase detector 106"—109" for deriving the message conveyed by reference pulses have been omited to simplify the representation, it is to be understood that their incorporation follows that of the receiver shown in Fig. 5.

In order to derive the message conveyed by Channel I pulses only, the entire demodulated output potential of unit 101" is supplied via a lead 200 to the grid circuit of an electron discharge device 124" which is arranged to be cut off by the self-bias resulting from the applied pulse wave. The enabling pulses at terminal 48a" are applied to the cathode circuit of device 124 and in response to each Channel I enabling pulse, the cutoff bias is removed. Thus, only the received, Channel I information carrying pulses appear at anode resistor 125". These pulses are supplied through condenser 105a" to the junction of rectifiers 106a"—107a" included in a phase detector which also includes resistors 108a"—109a".

Phase detector 106a"—109a" is also supplied with the sawtooth wave produced at a condenser 201 in response to the changes in conductivity in an electron discharge device 202. Device 202 is arranged to be normally highly conductive and its grid circuit is coupled to terminal 48a". Hence, for the duration of each Channel I enabling pulse condenser 201 charges exponentially from a low value to a high value thereby producing a sawtooth wave.

The sawtooth wave from condenser 201 and the Channel I message carrying pulses coact in phase detector 106a"—109a", in the same manner as described in connection with the similarly designated phase detector of the receiver in Fig. 5, and the desired signal is derived at point 117a". This signal, after translation through bandpass filter 118a" is applied to push-pull amplifier 127"—129". The amplified signal is supplied to terminals 130" via transformer 131" and a reproducing device (not shown) may be connected to these terminals to utilize the signal there available.

Another set of terminals 137" is connected to the primary circuit of transformer 131" in the same manner as the correspondingly designated terminals of the receiver. These, similarly, may be connected to a ringing or dialing circuit (not shown).

The circuit of "dropping out" the Channel I pulses, which carry the message derived at terminals 130", will now be described. Channel I enabling pulses at point 48a" are applied via a coupling condenser 203 to the grid circuit of an electron discharge amplifier device 204. After amplification these pulses are supplied with positive polarity to the grid circuit of an electron discharge device 205 which has its anode directly connected to the B supply at the terminal B+ 250. The cathode of device 205 is connected to ground via a lead 206 and a resistor 207. Resistor 207 is also included in the cathode circuit of another electron discharge device 208 to the grid circuit of which the entire output potential of unit 101" is applied through a coupling condenser 209.

Device 208 is normally operative to translate whatever signal pulses are applied to its input circuit. However, because of the connection of the cathode of this device 208 to the cathode of device 205, pulses corresponding to the Channel I enabling pulses are applied with positive polarity. Thus, the cathode of device 208 is driven positive relative to its grid for the duration of each of the enabling pulses periodically to interrupt anode current therein. In that way, a pulse wave is derived at anode resistor 210 for device 208 which contains all the pulse components supplied by unit 101" exclusive of the Channel I message carrying pulses.

This wave is applied to the grid circuit of device 211 for pulse amplification and shaping before application to the pulser portion of a unit 11". The radio frequency portion of unit 11″ thereupon supplies to antenna ground system 12″ for retransmission a pulse wave, which does not contain intercepted Channel I message carrying pulses.

For "inserting" pulses carrying new message information in place of those eliminated, the relay equipment contains various elements which find their counterpart in the transmitter of Fig. 1.

The sawtooth wave at condenser 201, which is timed with the Channel I enabling pulses derived at point 48a″, is applied to the grid circuit of an electron discharge device 52a″. Device 52a″ is arranged to be self-biased and, just as in the transmitter of Fig. 1, the point in time at which device 52a″ is transferred from a non-conductive to a conductive condition by the applied sawtooth depends upon its grid-to-cathode bias. The change in conductive condition is rapid and the resulting pulse of current in anode resistor 54a″ causes a voltage pulse to travel toward the unterminated end of delay line 68″. This pulse is reflected back toward the resistor 54a″, and, hence, a pulse of constant duration, but of controllable time occurrence is generated.

As in the transmitter of Fig. 1, a signal potential to be transmitted may be applied at terminals 57a″ and it is translated by transformer 58a″ to amplifier device 59a″. The anode of device 59a″ is connected through condenser 60a″ to the cathode of device 52a″, and, accordingly, the grid-to-cathode potential thereof is varied. The time of initiation of the pulses developed at resistor 54a″ thus depends upon the instantaneous amplitude values of the signal to be transmitted, and these pulses are supplied through condenser 61a″ to the grid circuit of electron discharge device 62a″. As does its correspondingly identified element of the transmitter function, device 62a″ serves to reproduce the applied pulses as positive square pulse of fixed predetermined amplitude, and these are supplied to unit 11″ via the cathode follower device 66a″.

Inasmuch as the pulses so generated occur during the occurrences of the Channel I enabling pulses, it is apparent that they occupy the same intervals in the relayed wave formerly occupied by the "dropped out" pulses. Accordingly, the new pulses may be combined with the wave to be relayed in unit 11″ and the pulse trains radiated by antenna-ground system 12″ contains message pulses as intercepted, with the exception that a new message is substituted for the one formerly carried by Channel I pulses.

It is, therefore, evident that my invention provides a pulse generating system which may be incorporated in transmitting, receiving and/or relay apparatus of the multiplex type for synchronizing the operation of such apparatus.

Moreover, another feature of my invention permits the substitution of a new message for one of the several messages intercepted and retransmitted by the relay apparatus.

While particular embodiments of my invention have been shown and described, it is apparent that changes and modifications may be made without departing from the invention in its broader aspects and therefore the aim in the appended claims is to cover all such changes and modifications as fall within the true spirit and scope of my invention.

What I claim as new and desire to secure by Letters Patent of the United States is:

1. The combination in a pulse multiplex system, a source of oscillations, a plurality of frequency dividers connected in cascade, the output of said source being connected to the input of said frequency dividers, a plurality of channel-gate devices, means to apply the output from at least two of said dividers to each of said gate devices, each gate device including means to produce a gating pulse when the summation of the outputs of the frequency dividers connected thereto exceeds a predetermined amount and said outputs as coupled to the different devices being so poled that different ones of said gate devices produce pulses at different times and in succession, means for intercepting a transmitted wave including pulse trains, each of said trains comprising a reference pulse followed by a series of information-carrying pulses, means for synchronizing said source of oscillations with said reference pulse portions of said trains, means for transmitting a pulse-type wave, means coupling said intercepting means to said transmitting means for relaying said intercepted wave, and means coupled to one of said gate devices and to said last-mentioned means for disabling said last-mentioned means during the occurrence of a predetermined one of said series of information-carrying pulses in each of said trains.

2. The combination in a pulse multiplex system, a source of oscillations, a plurality of frequency dividers connected in cascade, the output of said source being connected to the input of said frequency dividers, a plurality of channel-gate devices, means to apply the output from at least two of said dividers to each of said gate devices, each gate device including means to produce a gating pulse when the summation of the outputs of the frequency dividers connected thereto exceeds a predetermined amount and said outputs as coupled to the different devices being so poled that different ones of said gate devices produce pulses at different times and in succession, means for intercepting a transmitted wave including pulse trains, each of said trains comprising a reference pulse followed by a series of information-carrying pulses, means for synchronizing said source of oscillations with said reference pulse portions of said trains, means for transmitting a pulse-type wave, means coupling said intercepting means to said transmitting means for relaying said intercepted wave, means coupled to one of said gate devices and to said last-mentioned means for disabling said last-mentioned means during the occurrence of a predetermined one of said series of information-carrying pulses in each of said trains, and means operated by said one gate device and coupled to said wave transmitting means for supplying information-carrying pulses thereto during the time intervals in which said predetermined one of said series of pulses occur.

References Cited in the file of this patent

UNITED STATES PATENTS

| | | |
|---|---|---|
| 2,423,466 | Peterson | July 8, 1947 |
| 2,486,491 | Meacham | Nov. 1, 1949 |
| 2,543,736 | Trevor | Feb. 27, 1951 |
| 2,547,001 | Grieg | Apr. 3, 1951 |
| 2,551,816 | Staal | May 8, 1951 |

FOREIGN PATENTS

| | | |
|---|---|---|
| 363,403 | Great Britain | Dec. 18, 1931 |